United States Patent [19]
Adams

[11] Patent Number: 5,008,663
[45] Date of Patent: Apr. 16, 1991

[54] COMMUNICATIONS SYSTEMS

[75] Inventor: John L. Adams, Leiston, England

[73] Assignee: British Telecommunications public company limited, London, England

[21] Appl. No.: 76,276

[22] Filed: Jul. 22, 1987

Related U.S. Application Data

[63] Continuation-in-part of Ser. No. 753,993, Jul. 11, 1985, abandoned.

[30] Foreign Application Priority Data

Jul. 24, 1986 [GB] United Kingdom ................. 8618118

[51] Int. Cl.[5] ........................... H04Q 1/00; H04J 3/02
[52] U.S. Cl. .............................. 340/825.5; 340/825.51; 370/85.7; 370/95.1
[58] Field of Search ...................... 340/825.05, 825.52, 340/825.5, 825.51; 370/86, 87, 85.7, 95.1

[56] References Cited

U.S. PATENT DOCUMENTS

| | | | |
|---|---|---|---|
| 4,199,661 | 4/1980 | White et al. | 340/825.5 |
| 4,383,315 | 5/1983 | Torng | 370/85 |
| 4,412,326 | 10/1983 | Limb | 370/89 |
| 4,459,588 | 7/1984 | Grow | 370/89 |
| 4,507,777 | 3/1985 | Tucker et al. | 370/86 X |
| 4,538,263 | 8/1985 | Gabrielli et al. | 370/89 |
| 4,556,972 | 12/1985 | Chan et al. | 370/94 |
| 4,566,097 | 1/1986 | Bederman | 340/825.5 |
| 4,566,098 | 1/1986 | Gammage et al. | 340/825.05 X |
| 4,587,651 | 5/1986 | Nelson et al. | 370/89 |
| 4,592,049 | 5/1986 | Killat et al. | 370/89 |
| 4,661,952 | 4/1987 | Von Sichart et al. | 370/89 |
| 4,663,748 | 5/1987 | Karbowiak et al. | 370/89 |
| 4,707,831 | 11/1987 | Weir | 370/89 |
| 4,718,061 | 1/1988 | Turner | 370/89 |

OTHER PUBLICATIONS

IEEE Global Telecommunications Conference 1983, Mark, "Integrated Voice/Data Services on a Dual Ring Local Area Network" 11.1.1–11.1.5.
Local Networks and Distributed Office Systems, vol. 1, 1982, pp. 401–410, Leslie et al., "Organisation of Voice Communication on the Cambridge Ring".
Network for Blocking Switching of Data-Pierce, BSTJ, vol. 51, No. 6, Aug. 1972.
Tymnet-"A Terminal Oriented Communications Network", Proc. NCC vol. 38, (1971).
FDDI Token Ring–Draft Standard Software & Microsystems, vol. 2, No. 4, 8/83.
Local Area Networks-An Introduction-D. Hutchinson.
The Cambridge Digital Communications Ring-Wilkes et al.-Proceedings of the LACN Symposium, May 1979.
Mokhoff, "Networks Expand as PBXs Get Smarter", 1984, IBM Technical Disclosure Bulletin, vol. 26, No. 11, 4/84, pp. 5991–5992: Multiple Frame Transmission for Single Token.
Local Networks for Computer Communications, Proceedings of the IFIP Working Group 6.4, 27–29, Aug. 1980.
The Bell System Technical Journal, vol. 51, No. 6, Jul.-Aug. 1972, W. J. Kropfl: "An Experimental Data Block Switching System".
AT&T Bell Laboratories Technical Journal, vol. 63, No. 2, Feb. 1984, J. W. Mark and J. O. Limb: "Integrated Voice/Data Services on Fasnet".

(List continued on next page.)

Primary Examiner—Ulysses Weldon
Attorney, Agent, or Firm—Nixon & Vanderhye

[57] ABSTRACT

A communications network comprises a plurality of stations which can communicate via a ring. Information is transmitted from one station to another in message blocks which circulate around the ring. The message blocks include control bits and a protocol is employed which ensures that no one station can monopolize the available message blocks. At any of the stations, an emptying block is utilized by that station as a reallocation trial slot and places its own address therein for passage round the ring. On its return a system reset is instigated to allow all stations to be reallocated blocks.

16 Claims, 8 Drawing Sheets

FRAME FORMAT

OTHER PUBLICATIONS

Office Information Systems: J. O. Limb, Bell Laboratories, "Fasnet: Proposal for a High Speed Local Network".

AT&T Bell Laboratories Technical Journal, vol. 63, No. 8, Oct. 1984, Z. L. Budrikis and A. N. Netravali: "A Packet/Circuit Switch".

Nishida et al., "Prioritized Token Passing Method in Ring-Shaped Local Area Networks", 1983, IEEE, International Conference on Communications, vol. 2, Boston, Jun. 1983, pp. 939–944.

Zafiropuio et al., "Signalling and Frame Structures in Highly Decentralized Loop Systems", ICCC, 1972, pp. 309–315.

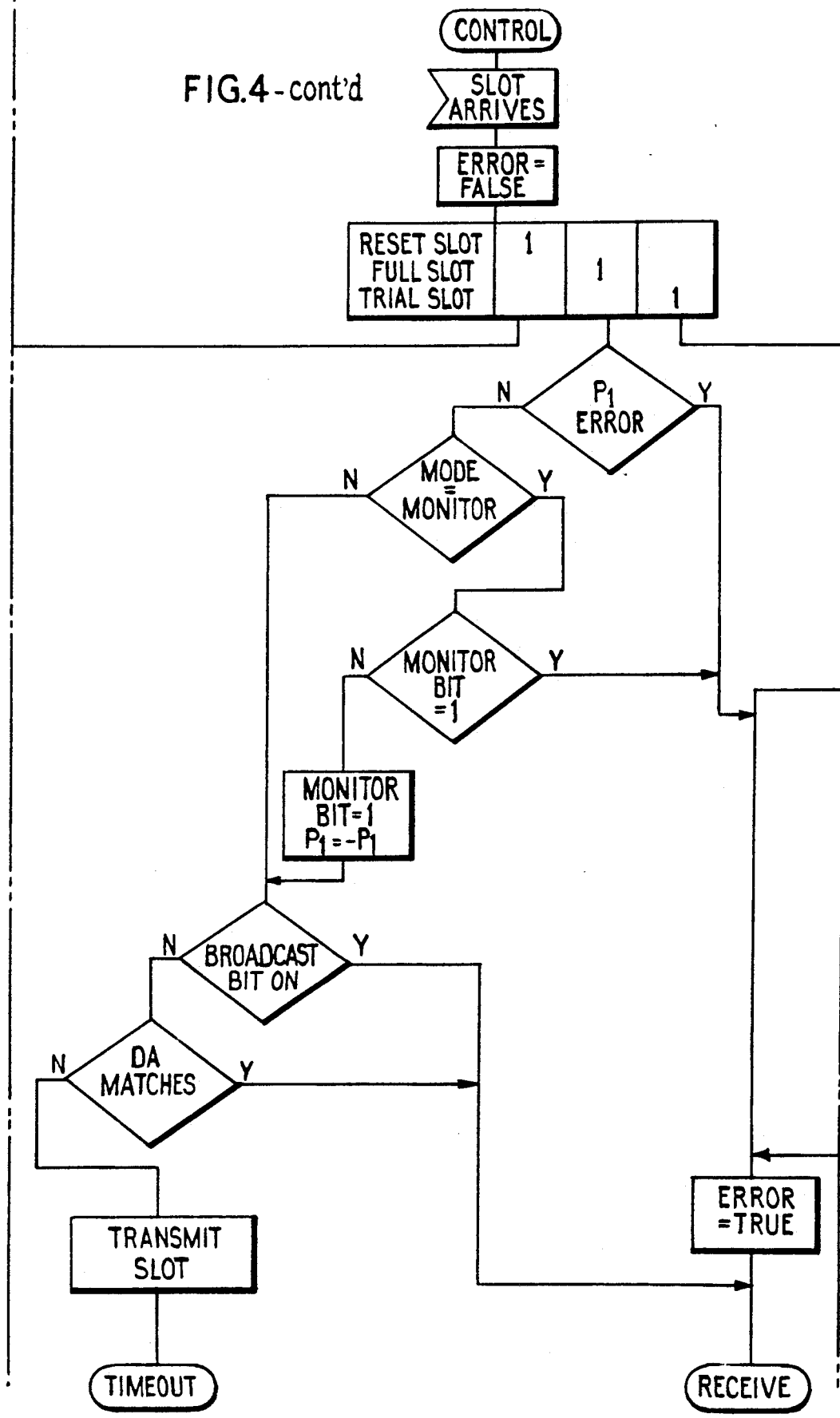

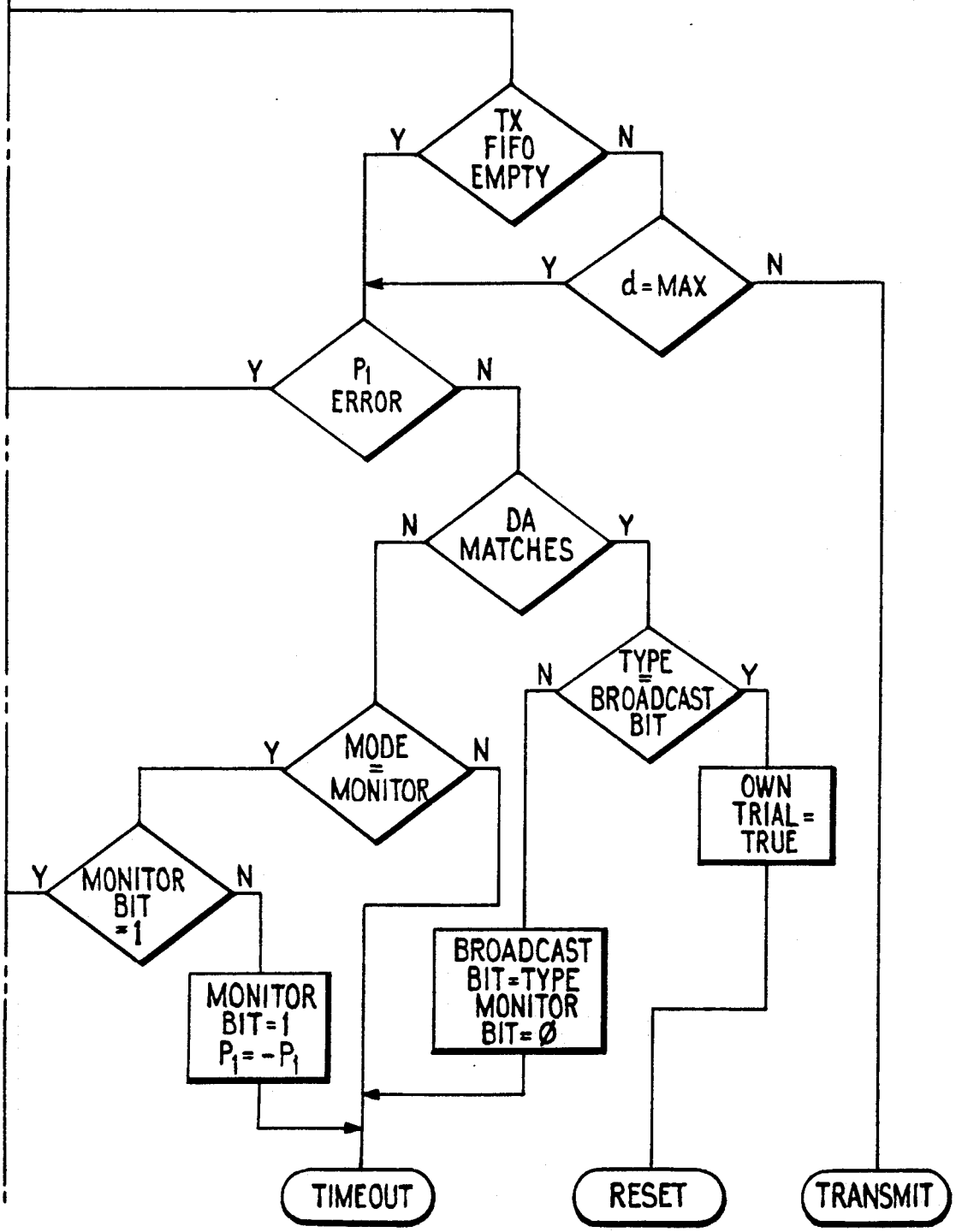
FIG.4 - cont'd

COMMUNICATIONS SYSTEMS RELATED APPLICATION

This is a continuation-in-part of commonly assigned U.S. application Ser. No. 753,993, filed July 11, 1985, now abandoned. Application Ser. No. 753,993 was abandoned in favor of file wrapper continuation Ser. No. 07/330,947, now U.S. Pat. No. 4,933,935, by John L. Adams entitled "Communications Systems".

BACKGROUND AND SUMMARY OF THE INVENTION

This invention relates to communications systems and a method for controlling such systems.

Systems providing for the transport of encoded signals on a communications link are well known. Many such systems are used for data signals which are not time critical; examples of such systems are packet switching networks and many local area networks (LANs). Many others can carry speech and video signals, where transmission delays above certain limits are unacceptable, but not data signals.

It has been proposed in our European Patent Application 85305017.7 published as 0168265 which corresponds to the applicant's above-identified U.S. Pat. No. 4,933,935 to provide a communications network as a ring with a number of stations and is capable of handling digital data from data processors, video or telephone equipment using a configuration that is known as a slotted ring protocol.

The present invention is concerned with modifications and improvements to such systems.

According to the invention there is provided a method for controlling a communications network comprising a plurality of stations which can communicate via a closed communication loop; said method including: providing information in digital form for transmission from one station to another in message blocks which circulate around the loop, each message block being provided as a first group of control bits and a second group of data bits, controlling each station when it requires to transmit so as to assume an active state in which it inserts digitally encoded information into empty blocks for transmission to a destination station via the loop, a station if it has inserted information into d blocks enters a state in which it cannot gain access to empty blocks for the transmission of information until it is reset in response to recognition of an empty block having travelled at least one around the loop, said resets being issued to each of said stations so that no station is in a preferential position with regard to the rate of reception of resets, and wherein the control bits of each block include bits which when that block is emptied at a station can then be set at that station to indicate a particular state indicative of a further allocation request.

According to a further aspect of the invention there is provided a communications system, comprising a plurality of locations for storing information to be carried in message blocks on a link, each location including control means for providing an allocation of d blocks to entitle the location to transmit one block onto the link whenever a block is waiting at that location, but if d blocks are transmitted onto the link from a location, that location loses its entitlement to transmit further blocks until a further allocation is received, and wherein further allocation means are provided for initiating a procedure for further allocation each time a block is emptied at any of said locations and is completed whenever a block initiated by said procedure travels throughout the link without cancellation by another location.

According to a further aspect there is provided a method of operating a communication system comprising allocating d message blocks only to each station within the system to avoid monopolisation by any station; utilising a block emptied at any location for the purpose of testing the allocation availability of further blocks regardless of whether the d allocation has been exhausted; and allocating further blocks whenever the utilised block has travelled throughout the system without being modified by another station.

BRIEF DESCRIPTION OF THE DRAWINGS

The invention will now be described, by way of example, with particular reference to the accompanying drawings. In the drawings.

DETAILED DESCRIPTION OF THE DRAWINGS

Communications network such as local area networks (LANs) metropolitan area networks (MANs), switches etc. allow a number of stations to communicate with each other by way of a signal carrying link.

In a ring or loop type of arrangement each station, which can incorporate a number of devices, is connected to a particular point on the ring known as a node.

In a slotted ring type network information in digital form is transmitted from one station to another in slots or blocks which circulate around the ring. A transmitting station seizes available slots in order to transmit its information to the other station. The slots include one or more bits into which can be inserted a code indicative of the destination station. In some types of slotted ring network the information carrying slot returns to the source station before it is emptied of data. This is wasteful of bandwidth since it could have been used by other stations along that part of the ring between destination and source station. Thus slotted ring networks have been developed in which the information carrying slots are emptied at the destination station. This arrangement can in theory be used to transfer more information in a given time but there is a problem in that it is possible for some stations to monopolise the slots.

Figure 1:
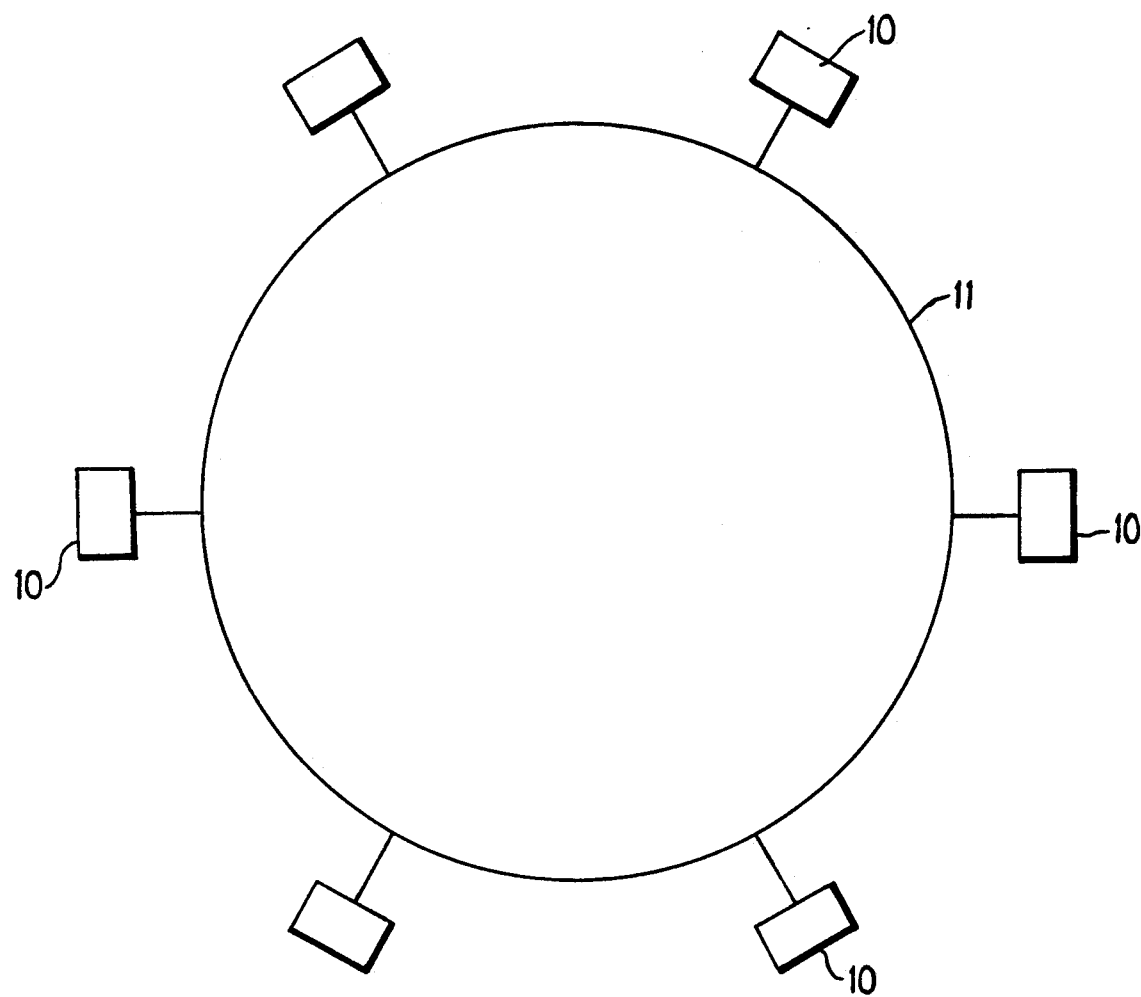
FIG. 1 is a simplified schematic diagram illustrating a communication network of the type used in our EP 0168265 system and in the present invention.

Referring to FIG. 1 of the drawings, a communications network system comprises a plurality of stations 10 which can communicate via a transmission ring or loop 11. The stations 10 can incorporate many forms of digital based devices such as data processing equipment, video devices, facsimile or telephone equipment and each station may concentrate traffic from several devices. Also one station could for example provide access to the public switched telephone network. The loop is designed to operate according to a slotted ring protocol.

One or more slots or blocks each of which comprises a predetermined number of bits circulates around the ring and can be seized by a station which wishes to transmit data to another station. The ring carries a fixed integer number of equal length slots which are established at switch-on and maintained continuously by a station which acts as monitor. In case of failure of the monitor station, another station can take over the monitor function.

In the present arrangement and that disclosed in EP 0168265 when a station wishes to transmit data to another station it is permitted to seize up to a total of d empty slots (which need not be successive slots) and when it has used that number d it is automatically placed in a state, known as a pause state, in which it is not permitted to seize further slots. That station is not allowed to seize further slots until it is reset to an active state. If other stations are waiting to transmit data the original station cannot be reset to an active state until those further stations have had an opportunity of using up their allocation of empty slots. In the previous arrangement disclosed in the aforesaid European Patent Publication, in order to achieve a reset situation, any node in a paused or idle state will conduct a trial using an empty slot and does this be entering its own address and a trial bit in the control field which then circulates in that slot and if not intercepted by another node waiting to transmit, i.e. one which has not used up its total d requirement and thus being in a "pause" state as defined supra, then on successfully returning, changes the status to 'Reset' which passes round the ring and resets the d allocation of the nodes or stations.

In the present invention however, the configuration is modified so that any receiving station after receiving the data will render that emptied slot an empty trial slot and place its own destination address therein and this passes round the ring and on return will cause a reset (unless the slot has been used for data by a station downstream). This gives a saving on the control bit allocation and a gain in bandwidth efficiency.

The way in which this new configuration is achieved will become apparent from the following description.

Figure 2:
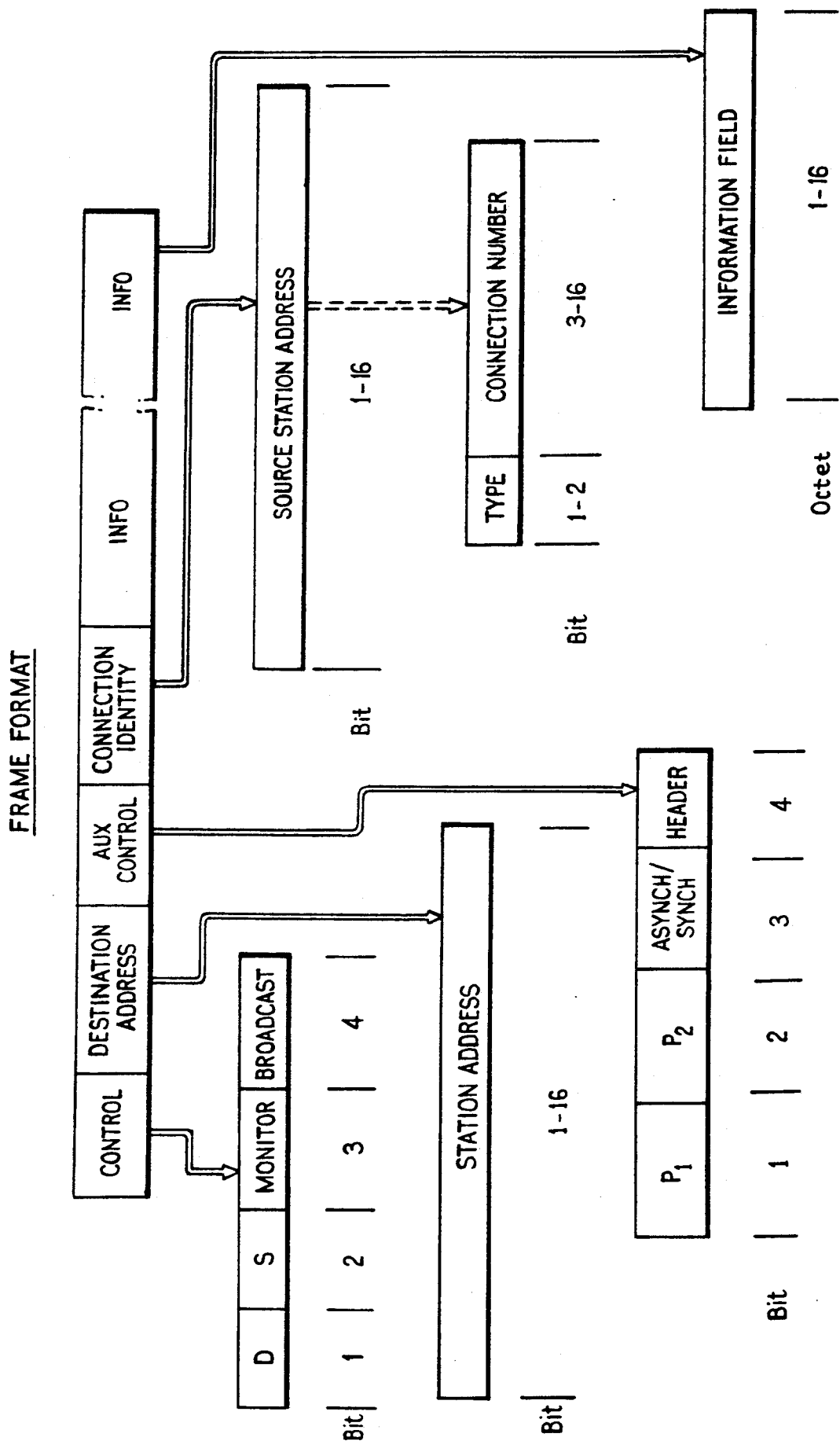
FIG. 2 shows the structure of a slot employed in the present invention using the network of FIG. 1.

Referring to FIG. 2 of the drawings this shows the arrangement of sections of a slot made up of a number of bits. The frame format is illustrated as five sections, respectively control, destination address, auxiliary control, connection identity and information.

(a) Control Field

As seen from the figure, the control field is of four bits called D, S, monitor and broadcast bits. This field structure is common to all frames. Monitor bit is cancelled by the destination node. However, if the Monitor bit is not cancelled and the special node subsequently sees the slot passing by with the Monitor bit set, it converts the slot to a trial slot after copying the contents of the slot into the error reporting queue. In addition the Monitor node performs the duties of an ordinary node.

Broadcast Bit

If the D bit is set to indicate a 'Full' slot and the Broadcast bit is set, then regardless of what is in the station address each node copies the contents of the slot into its receive (FIFO (except nodes operating priority received and where the broadcast is not a high priority broadcast). the Broadcast bit is cancelled by the node which originated the broadcast.

For 'trial' slots the Broadcast bit is used to store the value of the issuing node's TYPE flag, the purpose of which will be made apparent below.

(b) Destination Address

This consists of 16 bit address capability for the station address, and is common to all frames.

(c) Auxiliary Control Field

This four bit is common to all frames and these are designated parity $P_1, P_2$ Asynchronous/Synchronous and header.

Parity Bit $P_1$

The $P_1$ bit is a parity bit on the first 24 bits of the packet. If any node detects a parity error then it converts the slot into a 'trial' slot after copying the contents of the slot into the error reporting queue.

Parity Bit $P_2$

The $P_2$ bit is a parity bit on the next 16 bits of the slot header and is only checked by the destination node.

Asynchronous/Synchronous Bit

This bit enables packet to be sorted into synchronous and asynchronous streams on arrival and is used to differentiate between the two possible structures of the Connection Identity field.

Header Bit

This bit is used for the transmission of asynchronous services and, when set, it indicates that the mini-packet is to be interpreted as the first mini-packet of a new packet.

(d) Connection Identity Field

This sixteen bit field is common to all mini-packets.

Where the Asynchronous/Synchronous bit above is set to the Asynchronous mode, the 16 bit field labelled 'Source Station Address' is applicable.

Where the Asynchronous/Synchronous bit is set to the Synchronous mode, the 16 bit field comprising 2 'type' bits and 14 'connection number' bits is applicable.

Type Field

This field enables synchronous packets to be sorted into different streams depending on their type (e.g. constant bit-rate, variable bit-rate). Note that the Header bit can also be used (as it is not otherwise used in synchronous connections) so that this becomes a 3-bit field.

Connection Number

This 14-bit field is used to store the virtual connection number of synchronous connections.

(e) Information Field

This format is common to all frames and comprises $16 \times 8$ bits.

The information field of 128 bits together with the total of 40 bits associated with connection identity auxiliary control, destination address and control gives an overall slot size of 168 bits.

In operation when a station wishes to transmit data to another station it identifies an empty slot circulating on the ring, loads the control and address fields of the slot with pre-assembled data appropriate to indicate that the slot in now full and addressed to the required destination station. The data to be transmitted is inserted into the data field 21. The slot then travels around the ring and the destination station recognises the destination address and accepts the data in the data field. The slot is emptied at the destination station by rendering bits 1 and 2 to indicate an empty 'trial' slot. The destination station also inserts its own address in the destination field (the purpose of this will become apparent in the following description). That empty slot is then passed on to the next adjacent station which can make use of the slot if it has data to transmit.

Any station which has been rendered active may seize up to d empty slots. Once the threshold value d has been reached, which is sensed by a counter at the station, the station enters a pause or inhibited state in which it cannot seize any further slots even though it may have further data to transmit. The station remains in that pause state until it is reset to an active state as will be described below. It will be appreciated that subject to the d threshold restriction an active station can have several slots on the ring at any time. During a pause state the station can continue to receive data slots from other stations but cannot transmit data.

To achieve a return to full activity every node, when it is in the process of deleting a slot, operates as follows. Each conducts a 'trial' using the emptied slot to see if it can be passed all the way round the ring without being used. To do this it loads its own address into the destination area and marks the control field of the slot to indicate that it is performing a trial. However, the control field still indicates that the slot is empty. Hence, if a downstream node remains active, then that node will seize the empty slot and terminate the trial. This procedure carries on until a stage is reached where there are no more nodes waiting to transmit and an empty slot is returned to the node which originated the trial.

A successful trial slot is converted to a RESET slot by a suitable change in the control field. This RESET slot then circulates round the ring resetting the 'd' counters of every node. The counters are reset regardless of whether they have reached their maximum value or not. Clearly resets will be more frequent on lightly loaded rings.

Preventing Unwanted Resets

Returning to the way in which the system provides for the load control mechanisms described above, further explanation is now provided. It may be observed that the reset mechanism is fully distributed. Any node can perform this role which leads to a greater robustness of the system. However because several nodes may have near-simultaneous successful trials on a multi-slotted ring the problem of 'ghost' resets occurs. This means that one node issues a reset slot when there is already another on the ring. If both reset slots were allowed to go fully round the ring each node would experience a reset followed very rapidly by a second 'ghost' reset. This must be avoided since the time between successive resets is taken to be a measure of the current ring utilization (as already described).

To avoid 'ghost' resets the protocol operates with two boolean variables on each node, namely the trial 'TYPE' and OUTSTANDING RESET flags. Basically, when a node issues a reset slot it marks itself as an OUTSTANDING RESET node. Reset slots travel round the ring resetting 'd' counters as already described. However when they reach any OUTSTANDING RESET node they are returned to being ordinary empty slots. In this way a number of reset slots actually cover different arcs of the ring resetting the nodes. A timer $T_1$ is used to guard against the possibility that a reset slot is corrupted and, consequently, a node is left in the OUTSTANDING RESET state. When $T_1$ expires, the node is automatically returned from OUTSTANDING RESET state to normal mode. $T_1$ can be implemented as a simple counter which is loaded with an integer corresponding to the number of slots on the ring and is decremented as each new slot arrives.

The trial TYPE guards against a single node issuing more than one reset slot. Thus, when a node generates a trial slot it sets the BROADCAST BIT equal to the current value of the trial TYPE flag. A successful trial slot is turned into a reset slot only if the value of its BROADCAST BIT equals the current value of the node's trial TYPE flag. A reset changes the trial TYPE flag to the opposite value on every node. Thus outstanding trials which return after a reset will be rejected because they have the wrong value in their BROADCAST BIT. Only new trials will have the right value.

Thus, it will be seen that a station which wishes to transmit data can, when it is made active, use up to d slots before having to pause from the transmission of data. It is then not allowed to seize further empty slots. However, any station can initiate a trial using an empty slot to test whether at least one station on the ring is waiting to transmit. If there is such a station waiting then that station will seize the empty slot and overwrite its contents, thereby deleting the control field's trial values set by the original station. As other slots are emptied they will also be used to test the ring. This procedure continues until a stage is reached when no more stations are waiting to transmit and an empty trial slot returns to the originating station. This originating station responds by setting the control field values to indicate that the slot is now a reset slot. No node may seize a reset slot for the purpose of transmitting data and the contents of its control field may only be altered by a node which has an outstanding reset or by a particular node acting as the 'Monitor' whose purpose will become apparent in the following description. All stations respond to a reset slot by resetting their d allocations. This is known as resetting or refreshing the ring. It should be noted that the time between the first node reaching a pause state and the ring being refreshed is usually short in comparison with the time between each refresh.

Detection of Errors

One of the nodes assumes the role of 'MONITOR' whereby it prevents full slots or empty 'trial' slots from circulating continuously when they have bit errors induced in the slot header. Thus whenever any full slot or trial slot passes the Monitor node (including reset slots) a special bit is examined. If this bit, call the MONITOR BIT, is not set then the action of the Monitor node is simply to set the bit and then resume normal processing of the slot. However, if the slot reaches the monitor node with its Monitor bit already set then error correction is required. The Monitor node converts the slot into a 'trial' slot after copying the contents of the slot into its error reporting queue.

It will be appreciated that the d values can be chosen to provide each station with the bandwidth which it requires. It if is assumed that each station has the same d value then the instantaneous demand for bandwidth will vary from station to station being higher for example at stations with video transmissions. Some stations may therefore use their d allocation much quicker than others. The protocol described above ensures that the first station to use its allocation of d slots pauses momentarily thereby giving other stations the opportunity to transmit any data that has accumulated before the ring is refreshed and the high demand station can continue. In this way stations are guaranteed an equal share of the available bandwidth if required. A ring with fully loaded stations will share its bandwidth equally with a minimum guaranteed bandwidth being available at any station. This is an important feature of the present arrangement.

In practice it can be shown that delays are minimised if the minimum guaranteed bandwidth for each station is closely matched to its requirements. This can be achieved by allowing the d value of a station to be selected to correspond with its expected demand. Thus, for example, a station can be given as a minimum bandwidth the equivalent of one data channel in addition to which it can claim extra bandwidth for telephony and video. Consider a station which is using a single video channel of 32 slots in a repetition period which is not more than 2 msec. The internal counter of the station is set so that it can tell when 32 slots have been transmitted following which it enters the pause condition and thus allows other stations to transmit until it is reset. If the ring is lightly loaded refreshing will occur after a few ring rotations and stations will then be able to seize extra bandwidth. It can be determined that the refresh period shall not be longer than 2 msec so that each station examines the refresh period and if it is close to 2 msec such that there would not be sufficient empty slots for a node to seize 32 slots to make an additional video call (and leave a minimum of empty slots so that there was not in fact 100% utilisation of ring) then a node would not be able to transmit this additional load and that would be blocked. All stations are able to determine for themselves whether the refresh period is too close to 2 msec for them to seize extra bandwidth.

The control of the d value is carried out using a d threshold store at each station which holds two stored values of d. One value, representing the current d allocation, is the reference value controlling entry into the pause state. The other is the "next d threshold", which replaces the reference value on every reset. Both read and write access is provided on "next d threshold" allowing a separate load control module to control the value of d using a higher level protocol remote from the ring protocol. This is described in more detail below with reference to FIG. 3. If the maximum allowable reset interval is increased, the load control module can then increase the value of d accordingly. In effect the protocol provides a guaranteed bandwidth for established calls.

The details of the control of the next d threshold are as follows. First, next d threshold is initialised with some suitable small value eg. next d threshold equals 2. The purposes of this is to allow stations to support the low speed data service and signalling requests. The value of 2 would imply that as the time between successive resets approaches 2 msec the data service would still be 128 kbits/sec available at each station assuming a 128 bit slot information field. The fixed service is referred to as the background service.

When further low-speed data connections are set up on the ring the threshold d is not increased above the background value of 2. If there are no real-time services, the N stations will be able to supply 2N slots (assuming a background of 2 for all stations) before all stations reach their pause states and a reset occurs. Hence a ring loaded only by data connections has short reset intervals, although the ring may be fully loaded, and each station obtains a high bandwidth. The load of real-time calls on the ring can be built up in a controlled way as follows. When a new call set up request is made (speech, video or fast file transfer) the current average reset time is examined. If this indicates that there are sufficient empty slots within the 2 msec period to support the new service then the new call request is permitted. The next d threshold is then updated by an amount suitable for the additional connection (e.g. 2 Mbit/sec video would require an additional 32 so the next d threshold would then be a 32 plus background). As real-time calls are established, therefore, the effect is to reduce the bandwidth available to lowspeed data calls. Similarly, on termination of a call the next d threshold is decremented accordingly. In fact additional thresholds can be set for the average reset interval and for each service time so that a service request is blocked if the current average reset interval is above the appropriate threshold.

The maximum allowable period between resets is determined according to the requirements of real-time service on the network. For speech calls not on the public network, maximum allowable delays are around 2 msec. If no other real-time service )such as video) has more stringent delay requirements, then 2 msec is taken as the maximum delay interval.

If for some reason the average reset time becomes long than 2 msec the background service may be temporarily inhibited (e.g. by decreasing the next d threshold by an amount equal to the background value).

Restoration of the background occurs as follows. Whenever the latest reset time drops below some suitable threshold (less than 2 msec) the background is added. This carries on until the full background is returned. In this way the reset times can be controlled to permit services which are sensitive to packet loss.

It will be observed that once a call has been set up and bandwidth allocated for it, that call will be able to continue until it is terminated by the called or calling party (unless there is node failure, for example). This is in contrast to conventional ring systems such as the Cambridge ring where overloads result in buffer overflows, with consequent packet loss, or the slowing down of attached devices; this is not acceptable for real-time services, where overloads should result in unsuccessful call attempts rather than degradation or premature release of calls in progress.

Figure 3:
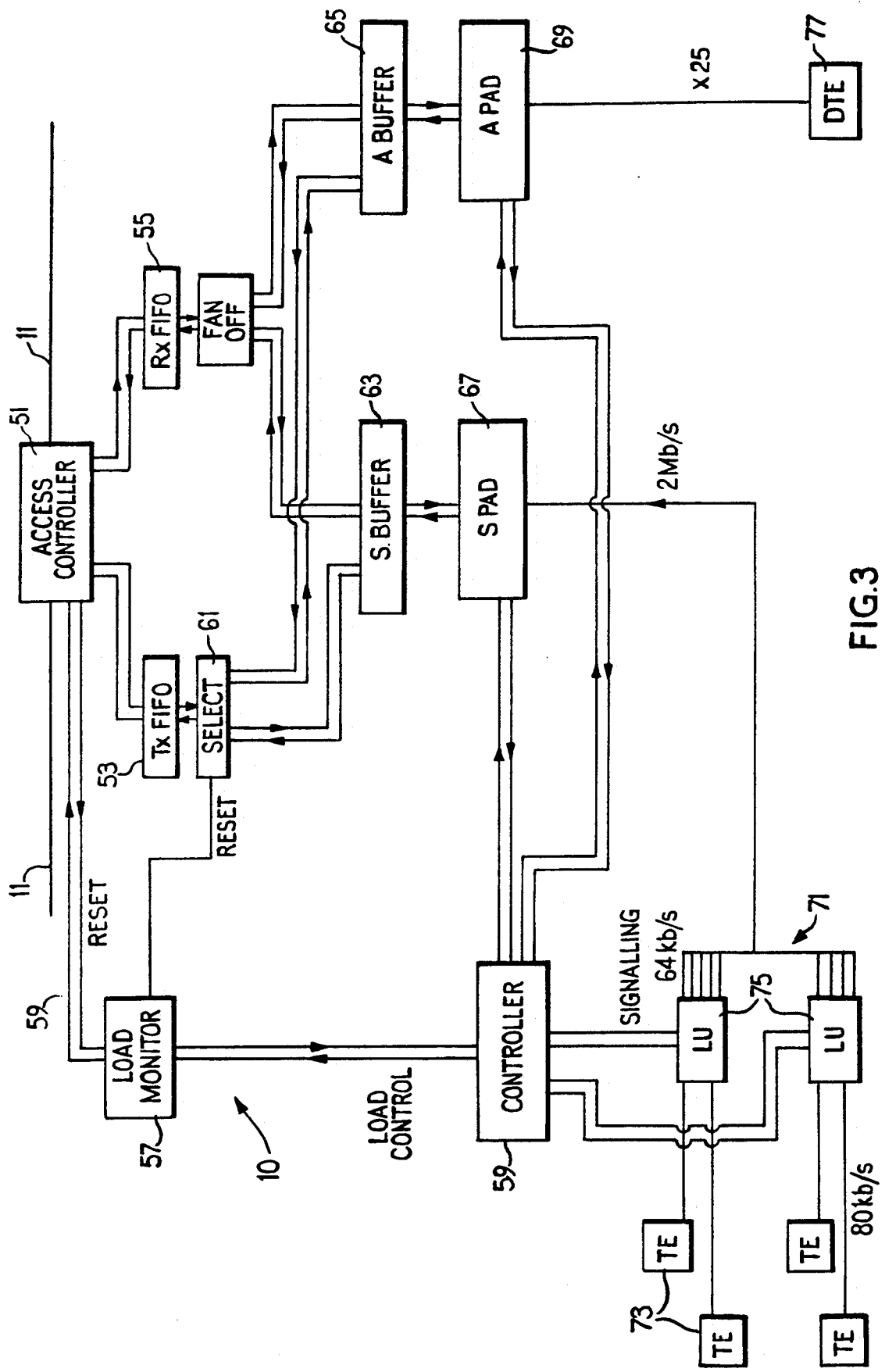
FIG. 3 is a schematic diagram illustrating one example of a station on the network.
Figure 4:
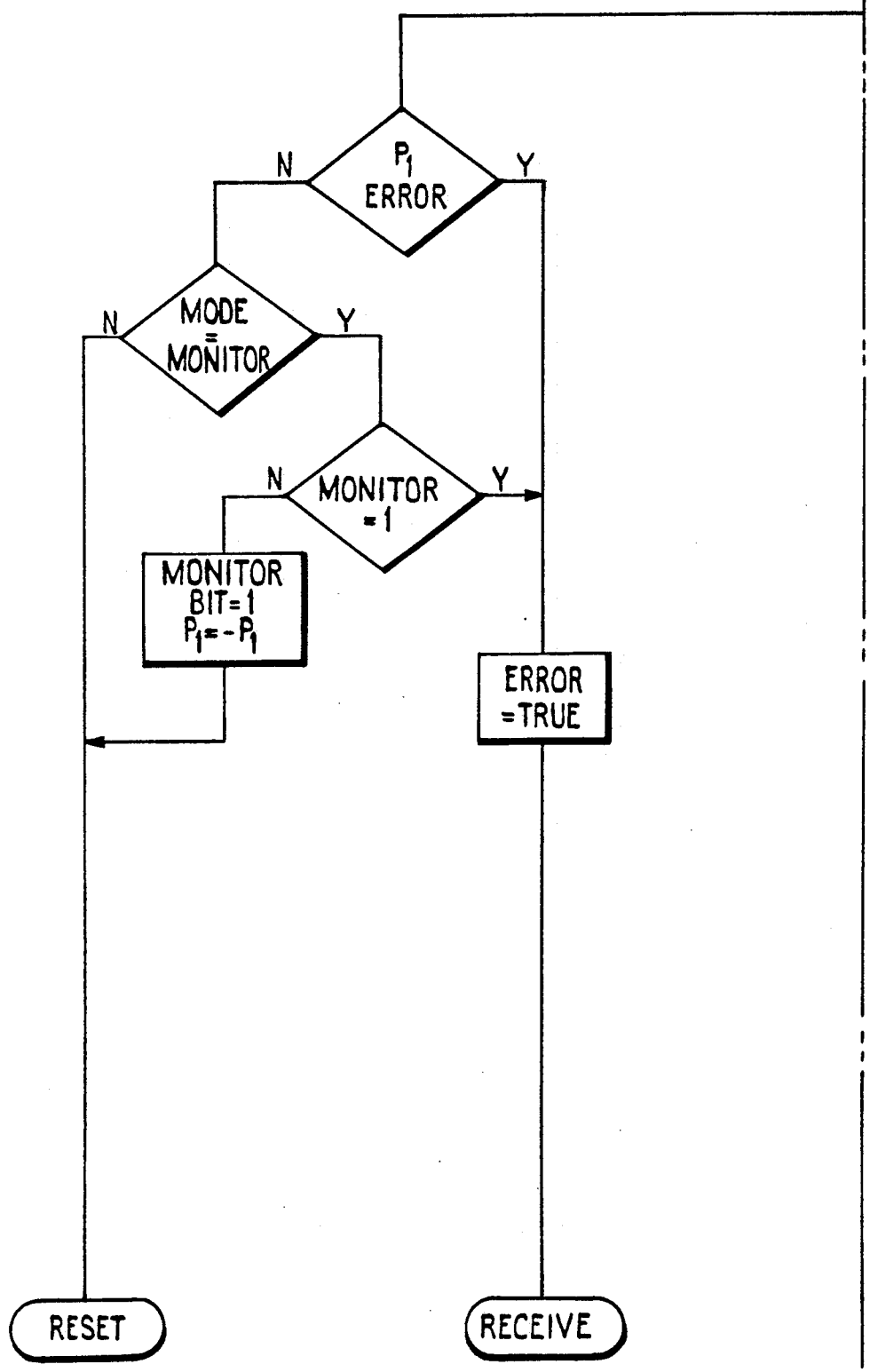
FIGS. 4 to 8 are flow diagrams of various functions carried out at a station of the network.
Figures 5, 6:
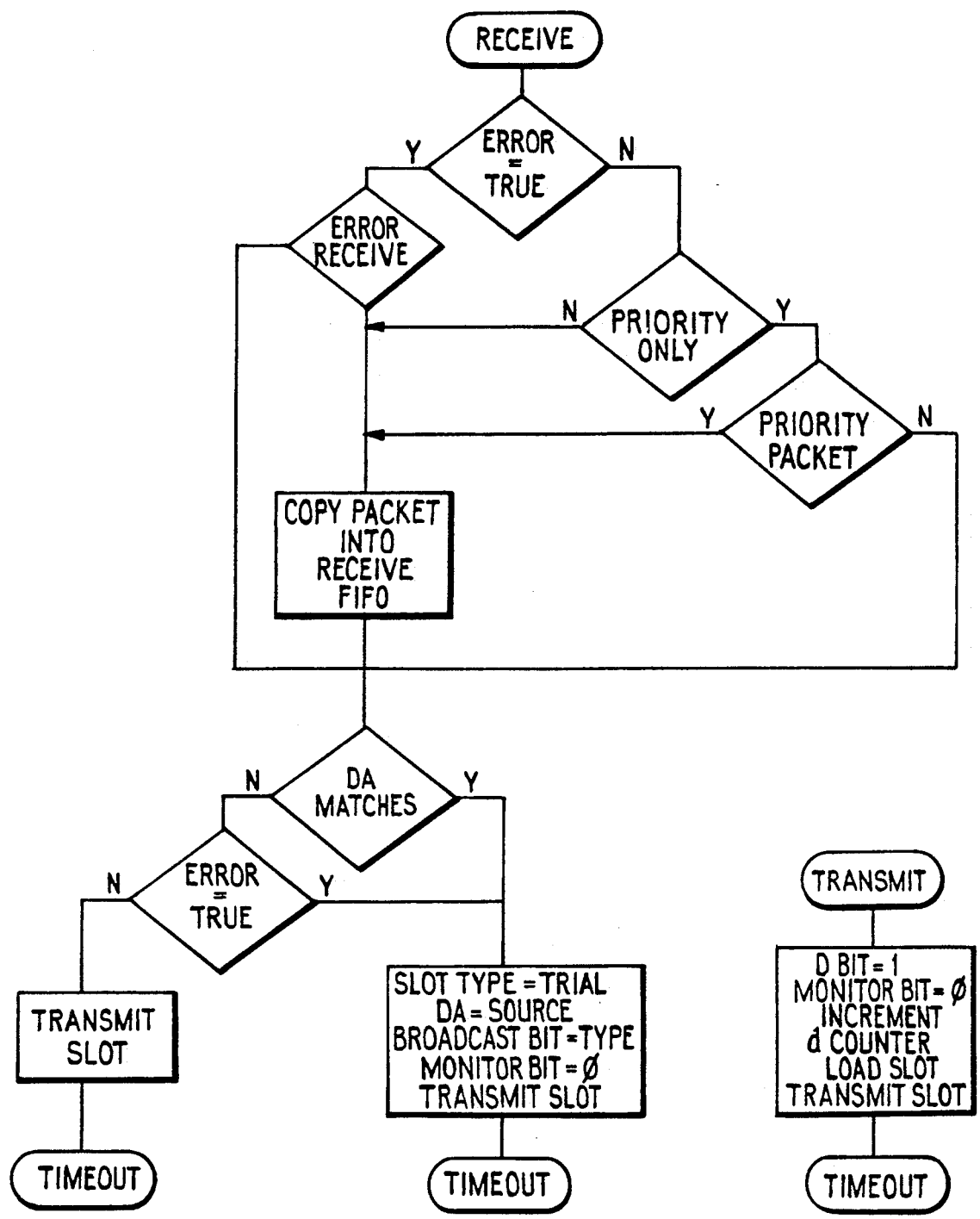
Figure 7:
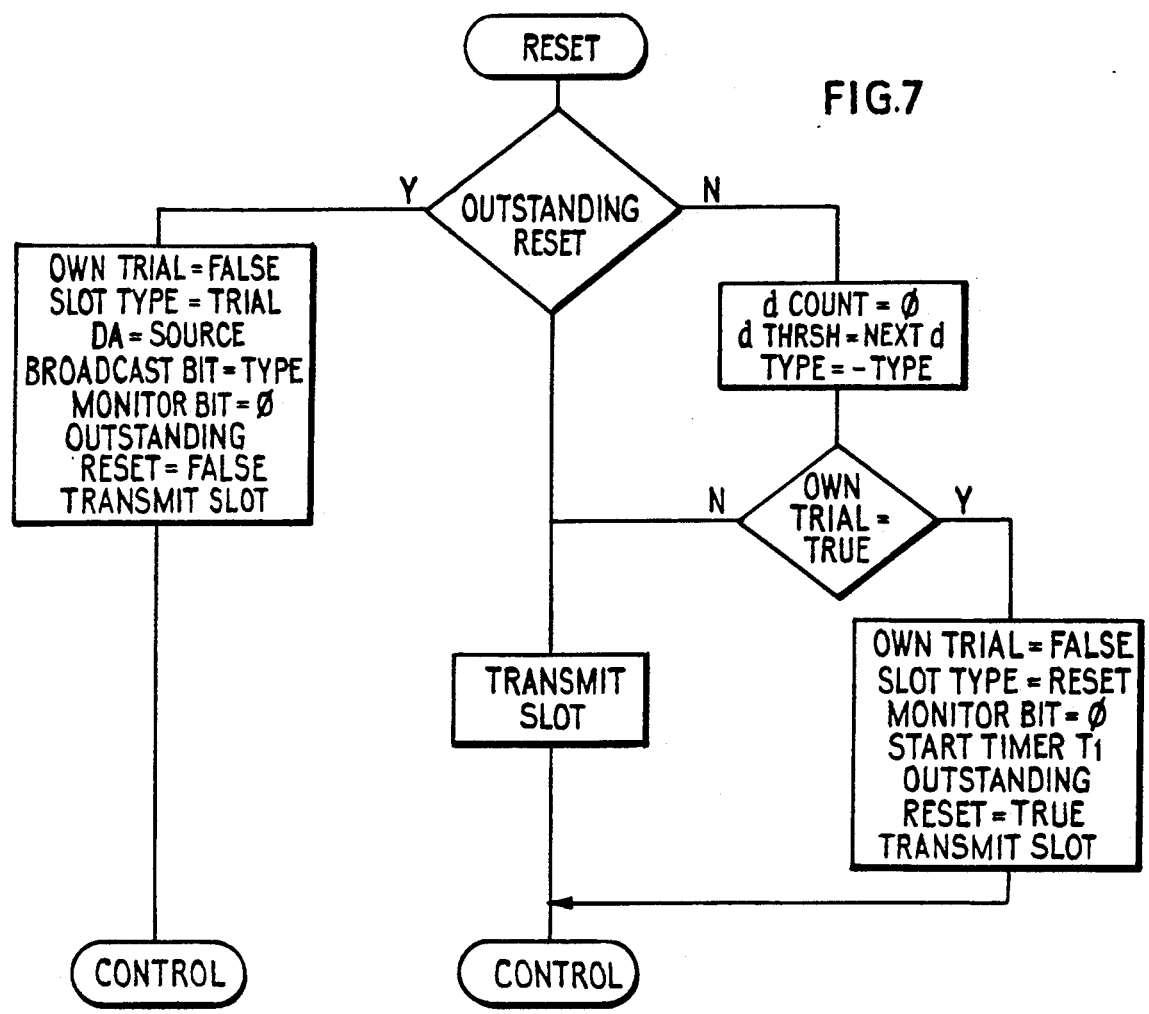
Figure 8:
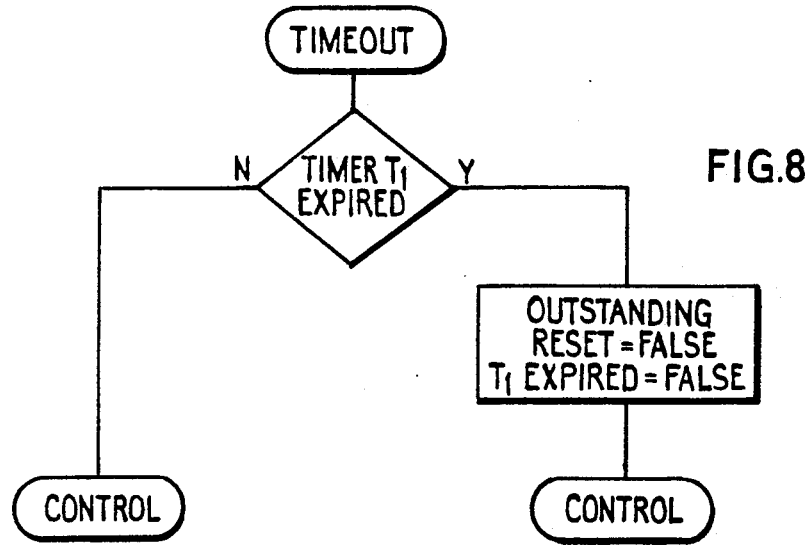

Referring to FIG. 3, this shows one possible design of a station 10. The station comprises access controller 51 which operates the protocol described above. Controller 51 comprises a reference store holding the two stored values of d for the station and provides for transmission of packets onto the ring 11 from transmit buffer 53. It also provides for reception of packets from the ring into receive buffer 55. Updates to "next d threshold" are received from load monitor 57. A pulse is sent to load monitor 57 on each reset. The load monitor counts how may reset signal pulses are received per maximum allowable reset interval, say 2 msec. Information on reset rate is also transmitted to controller 59 which receives call set-up requests in the normal way from attached devices. A new call requiring to send M slots per 2 msec interval can be accepted if the number of resets P per 2 msec is greater than or equal to M/L where L is the number of slots on the ring. If the reset interval rises above 2 msec, the load monitor 57 may reduce the threshold d by the background allocation.

On indication from the transmit buffer 53 that a further packet ca be accepted, select poller 61 polls synchronous and asynchronous buffers 63 and 65 containing ready-assembled packets to see which waiting packet has high priority, and this packet is transmitted to the transmit buffer 53 for onward transmission to the ring 11. The rate of acceptance of data packets is controlled by the ring reset rate as will now be explained. On each reset, a reset signal is set to the poller 61. This resets a counter within the poller which enables the acceptance of data packets until the counter senses that the background allocation has been transmitted. Entry of data packets into the transmit buffer 53 then proceeds whenever the transmit buffer 53 indicates that a further packet can be accepted and provided that no synchronous packet is waiting. Thus the rate of entry of data packets into buffer 53 is controlled by the rate of reception of reset signals by poller 61, and the correct mix of low and high priority packets is supplied to buffer 53 by poller 61. Load monitor 57 may inhibit the supply of reset pulses to poller 61 if the reset interval increases above the 2 msec maximum.

Packets for buffers 63 and 65 are provided from synchronous packet assembler/disassembler (SPAD) 67 and asynchronous packet assembler/disassembler (APAD) 69, respectively. SPAD 67 creates slot-sized packets from time division multiplexer (TDM) equipment 71, comprising terminating equipment (eg telephones) 73 and line units 75 which send signalling information to controller 59. On each call set up an appropriate header is set up by controller 59 and supplied to SPAD 67 for use on all packets for that call. All SPAD packets have high priority and are stored in buffer 63.

The maximum allowable period between resets is determined according to the requirements of real-time services on the network. For speech calls not on the public network, maximum allowable delays are around 2 msec. If no other real-time service (such as video) has a more stringent delay requirement, then 2 msec is taken as the maximum allowable delay interval.

APAD 69 creates slot-sized packets from an arriving data packet stream from data terminating equipment 77 and generates and verifies a frame check sequence. If a particular data connection requires additional guaranteed bandwidth, signals are sent to controller 59 and load monitor 57 to increase the value of d in access controller 51 and in the counter used to control background allocation in poller 61. In this case, the corresponding slots are marked for high priority.

FIGS. 4, 5, 6, 7 and 8, respectively, are flow diagrams summarising the control, receive, transmit, reset and timeout functions carried out by access controller 51.

The ring network described above may be used as a local area network (LAN) where the length of the ring is typically a few kilometers, and around 20 to 30 stations on the ring communicate with workstations, computers, VDUs, telephones etc around the office block or site serves by the LAN. Alternatively the ring may be much smaller (although the number of stations may be similar) and, together with other similar rings, form part of a high speed switch for speech, data etc. For public switching, the maximum interval between resets would need to be smaller than the figure of 2 msecs quoted above for a LAN. To meet CCITT requirements, resets would need to occur at least every 125 microseconds.

Each station, as shown in FIG. 3, is provided with packets from different sources, for example speech packets from equipment 71 and data packets from equipment 77. In a switch, packets of different types from one ring need transferring to another.

Thus in the system described herein, a 'trial' is conducted each time data is received at any node using the emptied slot whether or not the node is idle, paused or ready to send more data. If more data is to be sent this will go to subsequent empty blocks. In the extreme case this could be the block used as a trial—after it has been round the ring. This would be used for data as this has priority over the 'reset' function. In such a situation the trial would be unsuccessful and no reset would follow for that slot.

By providing a configuration that allows an emptying slot to be employed as a trial slot at any given station results in an improved degree of flexibility associated with a reduction in the number of bits required for control allocation and gives an increase in bandwidth efficiency.

Although in the example the information field has been selected to comprise $16 \times 8$ bits it is possible to select other suitable field formats e.g. $32 \times 8$ bits.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling a communications network comprising a plurality of stations which can communicate via a closed communication loop; said method including:
   providing information in digital form for transmission from one station to another in message blocks which circulate around the loop, each message block being provided as a first group of control bits and a second group of data bits,
   controlling each of said plurality of stations having data to transmit to assume an active state in which it inserts digitally encoded information into empty message blocks for transmission to a destination station via the loop,
   causing any of said stations in an active state, if it has inserted information into d message blocks, where d is an integer greater than zero and is variable, to enter a state in which it cannot gain access to empty blocks for the transmission of information until it is reset,
   controlling any receiving station after receiving data from a message block to set the control bits of said message block to indicate a further allocation request;
   controlling the receiving station setting the control bits of said block to further modify said control bits upon the station recognizing that said block has traveled unmodified once around the loop, said control bits being modified to indicate a reset;
   said resets being issued to each of said stations so that no station is in a preferential position with regard to the rate of reception of resets.

2. A method as claimed in claim 1, including controlling at each station the value for d, wherein for determining whether an increase in insertion rate of data information can be accommodated, said controlling step being responsive to the interval between resets to increase the value of d provided this interval is less than a predetermined value.

3. A method as claimed in claim 1 or 2, wherein the station at which the block is emptied sets control bits to test the loop for a further allocation request regardless of whether or not that station is in an inhibited state or has message data to send.

4. A communications system, comprising:
   a plurality of stations for storing information to be carried in message blocks on a link, each of said plurality of stations including control means for providing an allocation of d message blocks, where d is an integer greater than zero and is variable, to entitle each station to transmit one block onto the link whenever a block is waiting at that location, except when d blocks have been transmitted onto the link from said station causing said station to lose its entitlement to transmit further blocks until a further allocation is received; and means for obtaining a further allocation by controlling any receiving station after receiving data from a block to set control bits contained in an emptied block from which data has been received to indicate a further allocation request and for controlling the receiving station setting said control bits to further modify said control bits upon the station recognizing that said block has traveled unmodified once around the link.

5. A system as claimed in claim 4, wherein said means for obtaining a further allocation includes means for entering control data into the emptied block indicative of a further allocation request regardless of whether a previous allocation has been exhausted and means for entering new control data into the emptied block after said block has travelled throughout the data link, to allow a further allocation to be provided thereafter.

6. A system as claimed in claim 5, wherein said control means includes a counter provided at every station to count the number of blocks used by that station up to its allocation, said counter being reset by a message block carrying further allocation control data whether or not the previous allocation has been exhausted.

7. A system as claim in claim 5 or 6, wherein the control means is configured to allow the emptied block at a given station to be used for control data irrespective of whether or not that station has further messages to send.

8. A system as claimed in any one of claims 5 or 6, wherein a station downstream of a station initiating a further allocation procedure has control means capable of modifying control data in an emptied block to indicate a full block and to insert message data therein so as to terminate the further allocation procedure.

9. A system as claim in any one of claims 5 or 6 wherein detection means are provided to prevent allocation of a station which itself is concurrently carrying out a further allocation procedure in which some but not all stations have already received a further allocation.

10. A system as claimed in any one of claims 5 or 7, wherein modifying means are provided to adjust the allocation of d message block dependent on message block usage.

11. A system as claimed in any one of claims 5 or 6, wherein priority allocating means are provided to identify delay sensitive or non-delay sensitive messages.

12. A system as claimed in any one of claims 5 or 6 including means for determining whether message sources which may additionally be connected to any station and requiring additional message blocks can be handled by the station without system overload.

13. A system as claimed in any one of claims 5 or 6, including means for handling synchronous and asynchronous message packets for the message blocks.

14. A method of operating a communication system including a plurality of stations comprising:
   allocating d message blocks only to each of said plurality of stations within the system to avoid monopolisation by any station, where d is an integer greater than zero and is variable;
   utilizing an emptying block being emptied at any station for the purpose of testing the allocation availability of further message blocks regardless of whether the d allocation has been exhausted;
   and allocation further message blocks whenever the utilised block has travelled from said any station to all other stations in said communication system and back to the station where it was emptied without being modified by another station.

15. A method as claimed in claim 14, wherein the emptying block is utilised by inserting a digital code indicative of an allocation trial and originating station address.

16. A method as claimed in claim 14 or 15, wherein a block testing the allocation availability, on returning to the originating station is changed to function as an allocation block of providing a new allocation to each available station.

* * * * *